Jan. 13, 1925.  1,523,184
E. EGER
MIXING MACHINE
Filed March 6, 1924
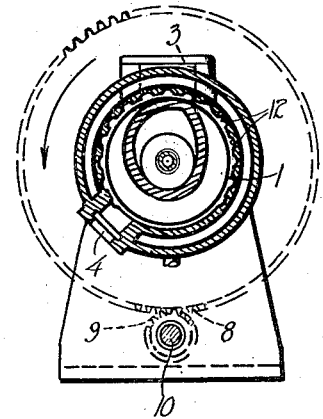
Fig.2.
Fig.4.
Fig.3.
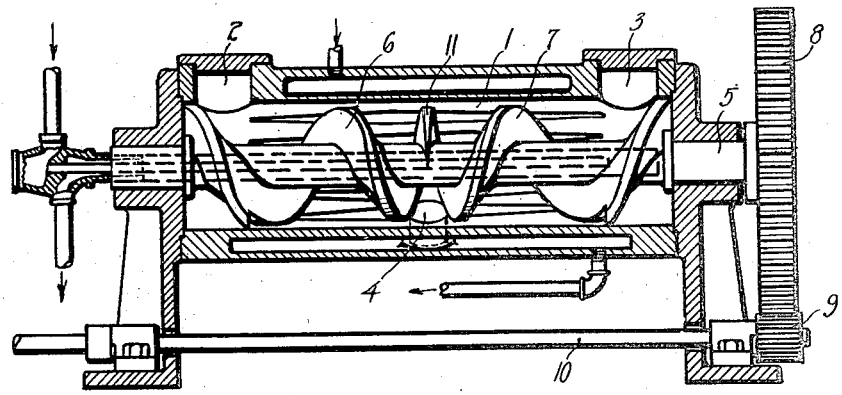
Fig.1.
INVENTOR
ERNST EGER
BY
HIS ATTORNEY Patented Jan. 13, 1925.

1,523,184

UNITED STATES PATENT OFFICE.

ERNST EGER, OF DETROIT, MICHIGAN, ASSIGNOR TO MORGAN & WRIGHT, OF DETROIT, MICHIGAN, A CORPORATION OF MICHIGAN.

MIXING MACHINE.

Application filed March 6, 1924. Serial No. 697,188.

*To all whom it may concern:*

Be it known that I, ERNST EGER, a citizen of the United States, residing at Detroit, county of Wayne, State of Michigan, have invented a new and useful Mixing Machine, of which the following is a full, clear, and exact description.

This invention relates to mixing machines for plastic materials and has for its principal object the devising of means whereby the plastic material or materials may be thoroughly milled or mixed in a shorter period of time and more economically than heretofore with the employment of similar types of machines.

Referring to the drawings forming a part of this specification,

Fig. 1 is a longitudinal sectional view of a machine embodying the invention;

Fig. 2 is a transverse sectional view of the machine;

Fig. 3 is a fragmental view of the interior wall of the mixing chamber showing five of the grooves formed therein; and Fig. 4 is an enlarged diagrammatic view of two of the grooves shown in Figure 3.

The invention viewed broadly comprises a mixing chamber, means for mixing the material while conveying it through the chamber from a point or points of lesser to a point or points of greater pressure, and a passageway having a portion of its length of increasing depth or cross-sectional area for conveying the material, after it has been so moved, from a point or points of greater pressure to a point or points of lesser pressure, the movement of the material through the passageway being due to the pressure of the material behind it.

In the preferred embodiment a screw is employed as the means for mixing the material and moving it along the chamber.

Machines of this general type are shown in patents granted to me, Nos. 1,427,271-2 and reference is made thereto for a more detailed description of the construction of such machines, the present invention being an improvement thereof. In the present embodiment the invention is illustrated in connection with a double end mixer employing a right- and left-threaded screw which is the type of machine shown in the above-mentioned Patent No. 1,427,271. The machine briefly described includes a mixing chamber 1 of cylindrical formation having feed or charging openings 2, 3, located at its ends, and preferably at the top, and a discharging opening 4 preferably located at the center near the bottom. A shaft 5, carrying right- and left-threaded screws 6 and 7, is revolubly mounted in the cylinder and has secured on an end extending from the cylinder a gear 8 which is in mesh with a driving pinion 9 secured on a drive shaft 10 which is driven by any desired source of power for revolving the screws. The screws are of decreasing pitch from the charging ends of the mixing chamber toward the center and are preferably symmetrically arranged on the shaft so that they will meet as shown at 11 at the center. The screws are shown of substantially the same diameter as the cylinder at the charging ends and of lesser diameter throughout the remainder of their lengths for reasons more fully described in my before-mentioned patents.

On account of the varying pitch of the screws the material as it is moved along the mixing chamber will be under a continually increasing pressure from its starting points at the charging ends of the screws where it is of least pressure to the point of least pitch, in the present embodiment, at the center of the chamber where it is of greatest pressure. I have found that if a passageway is opened to the material at a point of relatively high pressure and the passageway has for a considerable length therefrom a gradually increasing depth or cross-sectional area that it will afford an avenue of travel for the material of decreased resistance, and that therefore, as the material is ever seeking a path of less resistance, it will readily enter such a passageway at the point of relatively high pressure and be moved along due to the pressure of the material behind the part so moving. Furthermore, I have found that if the passageway is opened to a point or points in the chamber where the material is under less pressure as at a charging end of the screw that the material will move along the passageway and leave it at such point or points to again be brought under the direct action of the screw at such point of lesser pressure, and by the action of the screw will be further mixed and moved along the chamber to a place of higher pressure where it again enters the passageway, and the operation is repeated. This will continue until the material is thoroughly mixed and will require much less time than is possible with prior machines employing a screw.

In the practical carrying out of the invention the passageway is preferably composed of a plurality of grooves formed in the wall of the cylinder having their depth, or cross-sectional area, or what may be termed for convenience their cross-sectional dimension, increasing for a considerable distance of their length from the point or points where they receive the material, that is to say, from the point or points of greatest pressure toward the point or points of least pressure. I have found that this increase of depth or cross-sectional area while it should continue for quite an appreciable distance need not extend throughout the entire lengths of the grooves but that thereafter the grooves may decrease in depth or cross-sectional area for the remainder of their lengths as the material moving therethrough will be forced even through the portion of decreasing depth or cross-sectional area by the pressure of the material behind it. I have furthermore obtained very satisfactory results from a V-shaped groove of increasing depth or increasing cross-sectional area extending from a point of greater pressure for a suitable distance and then of decreasing depth and cross-sectional area for the remainder of the distance. The side walls of such a groove diverge longitudinally until the greatest depth and cross-sectional area is reached and then converge until they vanish or merge in the wall of the cylinder. By this construction the material is easily moved entirely out of the groove and the groove cleaned in the most satisfactory manner.

The drawings show a preferred embodiment of my invention devised for mixing together two plastics such as rubber or rubber compounds, one being fed into the chamber through the charging opening 2 and the other through the charging opening 3. The passageway for conveying the materials from the point of greatest pressure is composed of a plurality of grooves formed in the wall of the chamber and will vary in number, size, and arrangement dependent largely upon the natures of the materials to be treated. For instance, I have found in general very satisfactory results to follow by the crowding of the grooves more at the top of the cylinder than elsewhere and providing them with greater depths at the top of the cylinder than elsewhere. In the present embodiment the grooves 12 are shown of similar construction but alternately reversed, to provide two series 13 and 14, the grooves of one series alternating with the grooves of the other. The grooves of both series are V-shaped in cross-section. The grooves merge at both ends into a point and vanish in the wall of the cylinder thereby permitting the material therein to be entirely cleaned therefrom as already described. The grooves increase in depth and cross-sectional area as they progress from the ends, the series 13 reaching the greatest depth and cross-sectional area at a considerable distance to the right of the center line as viewed in Figures 3 and 4, and the series 14 reaching the greatest depth and cross-sectional area at a considerable distance to the left of the center line. It will be noted that the grooves increase in depth directly with the increase of their cross-sectional areas. The greatest depth and cross-sectional area to be employed and the position of same relative to the center line or point of greatest pressure will depend to a considerable extent upon the nature of the materials to be treated.

The operation of a machine of the double end type involving the present invention is as follows: The chamber is charged with the plastics as for instance rubber or rubber compound in a plastic form through the charging openings 2 and 3, and these openings and the discharging opening are then closed. For purposes of contrast and clearness of illustration the two charges will be termed hereafter the white compound which is presumed to be charged through the charging opening 2 and the black compound presumed to be charged through the charging opening 3. These two compounds will be mixed and moved along the chamber by their respective screws from their points of least pressure where the pitch is the greatest at the charging end to the point of greatest pressure where the pitch is the least at the center. Here the two materials meet and being under the maximum pressure they seek a path of less pressure or less resistance. Accordingly the white compound will continue the general direction of its movement through the chamber and will be forced to the right of the center line and into and along the passageway formed by the series of grooves 13 to the right of the center line, and the black compound will likewise continue the general direction of its movement through the chamber and will be forced to the left of the center line and into and along the passageway formed by the series of grooves 14. As these grooves are increasing in depth and cross-sectional dimension they continually offer less resistance until the point of greatest depth and cross-sectional area is reached and the two materials will accordingly readily move along these grooves due to the pressure of the material behind them until the point of greatest depth and cross-sectional area is reached. At this point the grooves gradually decrease in cross-sectional area and depth until they vanish at their ends in the wall of the chamber. The materials will continue their movement through these portions of the grooves due to the pressure behind them until they are forced out of the grooves and are brought again under the action of the screw but at the opposite end of the chamber, the black material being thus mixed or blended with the white material being milled by the screw at the left, and the white material being mixed or blended with the black material being milled by the screw at the right.

This taking of a relatively small quantity of the material from the right-hand side of the machine and mixing it with the larger quantity of the material at the left-hand side, and vice versa, the taking of a small quantity of material from the left-hand side and mixing it with the larger quantity at the right-hand side is continually going on as the screws revolve until the two materials are thoroughly mixed and milled together. This requires much less time to accomplish and can be done at much less expense than has been found possible in machines of former constructions.

While the theory of the operation of the machine has been described as it is believed to exist it is of course possible that the materials do not follow the paths in the manner described with perfect mathematical exactness. It is, however, a fact that in machines where the plastic material or materials are milled and moved from a point or points of lesser to a point or points of greater pressure if grooves such as have been described are employed a very material saving in time and expense will be effected in the mixing and blending of the prastic materials.

As many apparently widely different embodiments of this invention may be made without departing from the spirit thereof, it is to be understood that I do not intend to limit myself to the specific form of the invention as set forth except as indicated in the appended claims.

Having thus described my invention what I claim and desire to protect by Letters Patent is:

1. A machine for mixing plastic material, comprising a mixing chamber, means for mixing the material while moving it along the chamber, and a passageway open to said chamber for receiving and conveying the material after it has been so moved, said passageway being of varying cross-sectional dimension and having its exit end opening into said chamber.

2. A machine for mixing plastic material, comprising a mixing chamber, means for mixing the material while moving it from a point of lesser pressure to a point of greater pressure, and a passageway of varying cross-sectional dimension for conveying the material from a point of greater pressure to a point of lesser pressure.

3. A machine for mixing plastic material, comprising a mixing chamber, a screw revolubly supported therein, means for revolving the screw whereby the material may be mixed while being moved along the chamber, and a passageway for conveying the material after it has been so moved, said passageway being of varying cross-sectional dimension and having its exit end opening into said chamber.

4. A machine for mixing plastic material, comprising a mixing chamber, means for mixing the material while moving it from a point of lesser pressure to a point of greater pressure, and a passageway of varying cross-sectional dimension for conveying the material from the point of greater pressure back to the point of lesser pressure.

5. A machine for mixing plastic material, comprising a mixing chamber, means for mixing the material while moving it along the chamber from points of lesser pressure to points of greater pressure, passageways of varying cross-sectional dimension for conveying the material from points of greater pressure to points of lesser pressure.

6. A machine for mixing plastic material, comprising a mixing chamber, a double screw revolubly supported therein, means for revolving the screw whereby the material may be mixed while being moved along the chamber from points of lesser pressure to points of greater pressure, and passageways of varying cross-sectional dimensions for conveying the material from points of greater pressure to points of lesser pressure.

7. A machine for mixing plastic material, comprising a mixing chamber, means for mixing the material while moving it along the chamber, and a passageway comprising a plurality of grooves formed in the wall of the chamber for conveying the material after it has been so moved, said grooves being of varying cross-sectional dimensions and having their exit ends opening into said chamber.

8. A machine for mixing plastic material, comprising a chamber, a screw revolubly supported in the chamber, means for revolving the screw whereby the material will be mixed while moving along the chamber, and a passageway comprising a plurality of grooves formed in the wall of the chamber for conveying the material after it has been so moved, said grooves being of varying cross-sectional dimensions and having their exit ends opening into said chamber.

9. A machine for mixing plastic materials, comprising a mixing chamber, a double screw revolubly mounted therein, means for revolving the screw whereby the materials will be moved from points of lesser pressure at the outer ends of the screw to points of greater pressure at the center of the screw, and passageways comprising series of grooves formed in the wall of the chamber increasing in cross-sectional dimension from the center, one series increasing toward one end of the chamber and the other series increasing toward the opposite end of the chamber.

10. A machine for mixing plastic material, comprising a mixing chamber, means for mixing the material while moving it along the chamber, and a passageway comprising a plurality of grooves formed in the chamber in the same general direction as the path of movement of the material, said grooves increasing from each end in cross-sectional dimension to a point of greatest cross-sectional dimension between the ends.

11. A machine for mixing plastic material, comprising a mixing chamber, means for mixing the material while moving it along the chamber, and a passageway comprising a plurality of grooves formed in the chamber in the same general direction as the path of movement of the material, said grooves increasing from each end in cross-sectional dimension, part of said grooves reaching their greatest cross-sectional dimension on one side of the center line and another part of said grooves reaching their greatest cross-sectional dimension on the opposite side of said center line.

12. A machine for mixing plastic material, comprising a mixing chamber, means for mixing the material while moving it along the chamber and a passageway comprising a plurality of V-shaped grooves formed in the chamber in the same general direction as the path of movement of the material, said grooves increasing from each end in cross-sectional dimension to a point of greatest cross-sectional dimension between the ends.

13. A machine for mixing plastic material, comprising a mixing chamber, means for mixing the material while moving it along the chamber, and a passageway comprising a plurality of V-shaped grooves formed in the chamber in the same general direction as the path of movement of the material, said grooves increasing from each end in cross-sectional dimension to a point of greatest cross-sectional dimension between the ends, the sides of said grooves converging from said point to the ends of the grooves where they vanish at the wall of the chamber.

Signed at Detroit, county of Wayne, State of Michigan, this 28th day of February 1924.

ERNST EGER.